Dec. 16, 1941.  A. W. MALL  2,266,227
FLEXIBLE HOUSING
Filed July 27, 1939  2 Sheets-Sheet 1
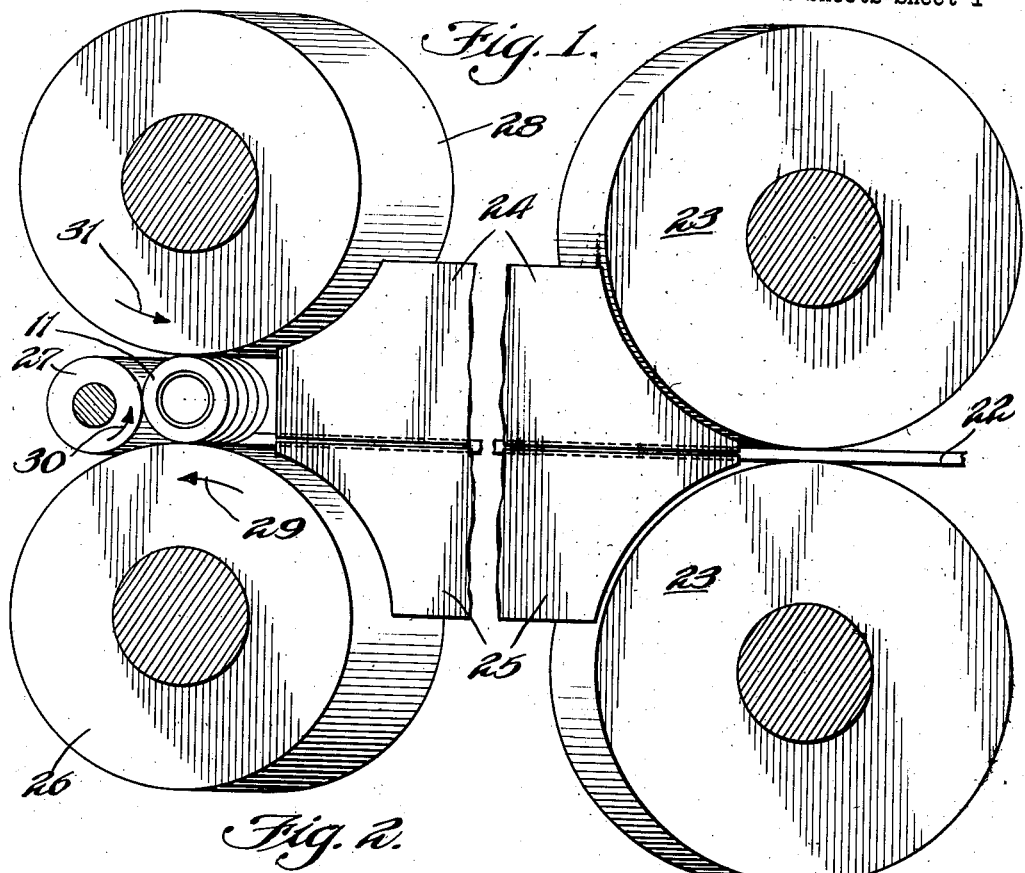
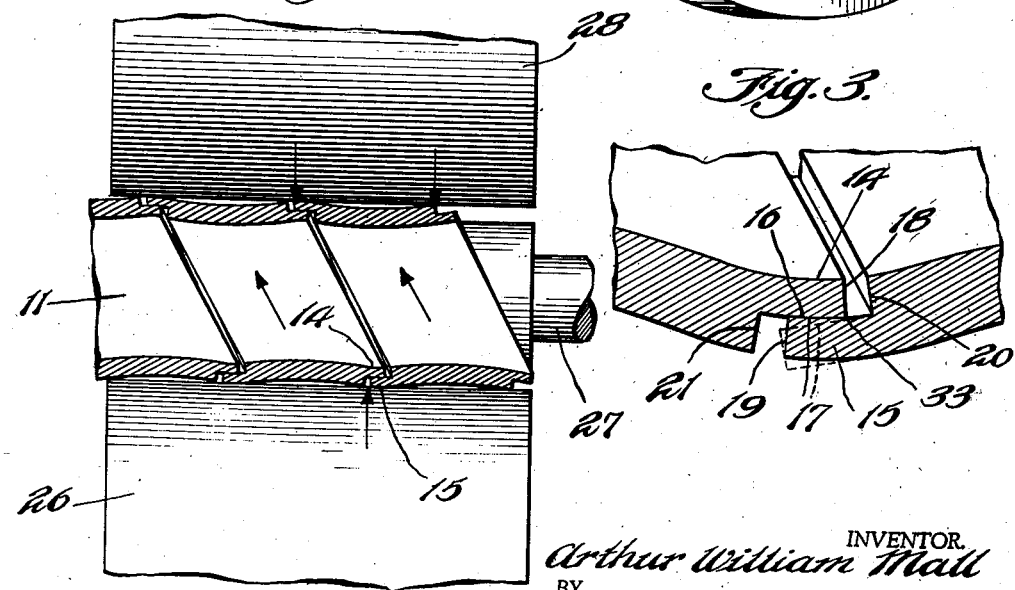
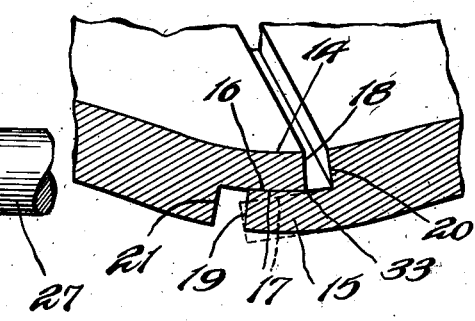
INVENTOR.
Arthur William Mall
BY
L. H. Latta
ATTORNEY.

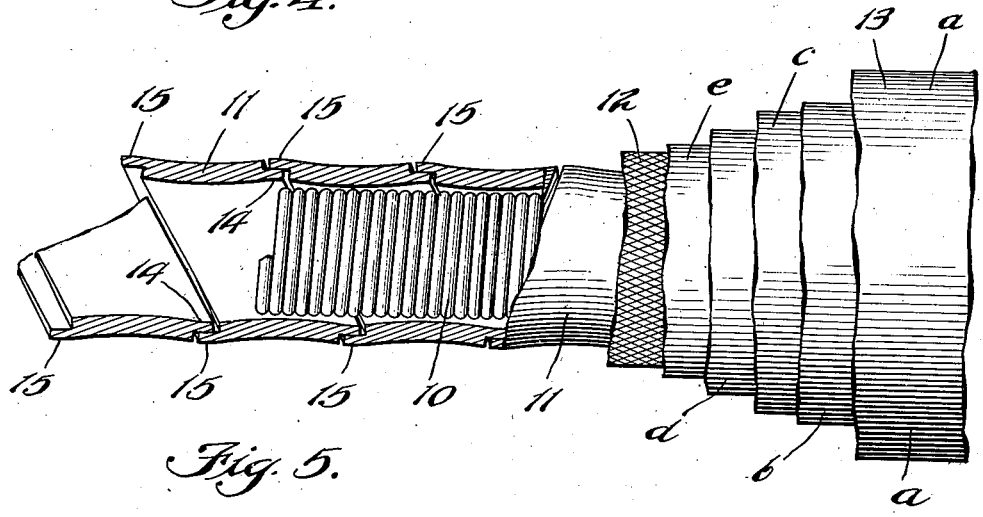

Patented Dec. 16, 1941

2,266,227

UNITED STATES PATENT OFFICE 2,266,227

FLEXIBLE HOUSING

Arthur William Mall, Flossmoor, Ill.

Application July 27, 1939, Serial No. 286,767

4 Claims. (Cl. 138—51)

This invention relates to flexible metallic housing for flexible shafting and has as its general object to provide an improved flexible housing which is adapted to provide maximum protection against destructive wear on the encased flexible shafting.

Another object is to provide an improved method of making such a housing.

One of the problems encountered in flexible shafting for carrying heavy loads in power driven implements such as concrete vibrators, grinders, etc., is that of rapid and destructive wear arising from sharp bends in the shafting. Another problem is that of foreshortening of the housing under extended periods of use, resulting again in rapid wear on the flexible shaft and the liner of the housing. This latter condition arises in conventional housings wherein the inner liner is coiled under axial tension which sets up axial compression between its abutting edges for the purpose of sealing the liner against the escape of its contained lubricant. Under constant flexing, the abutting edges of the liner will wear down, reducing the width of the coiled ribbon of which the liner is composed and allowing the liner to shrink axially.

The invention contemplates a flexible housing which solves both of these problems, i. e., which is adapted to distribute the bending of the housing through a broad arc of substantially uniform curvature, avoiding sharp bends, and which is adapted to maintain the same axial length at all times. In attaining these results, the invention provides an inner liner which is coiled in such a manner as to completely avoid the setting up of axial compression between its edges, the edges actually being spaced apart slightly in the normal unflexed state of the housing, allowing the edge regions on the inner side of a curved section of the housing to close together while the opposite edge regions spread farther apart, whereby the mean spacing of the edges, measured at the axis of the housing, may remain the same at all times.

The invention further aims to attain the aforestated beneficial results without sacrificing the characteristic of the liner in sealing in the lubricant against migration into the rubber outer cover of the housing.

These results are made possible by fashioning the liner with flanged edge regions, in overlapping engagement under radial compression, allowing the edges to close and spread without affecting the axial dimension of the housing and without breaking the seal which is formed by such overlapping engagement. Spreading of the edge is controlled by the frictional resistance set up between the engaging surface of the overlapping regions, and by an intermediate sheath of braided wire which definitely limits the amount of spread within a range wherein the flanged regions remain in overlapping engagement at all times. In order that the action of the sheath may be positive, it is braided in direct contact with the exterior surface of the liner.

Radial compression between the overlapping regions is amplified by the method of coiling the liner wherein the ribbon stock is allowed to assume an outwardly concave, curved cross section as it enters the coiling rolls, thereby disposing the flanged regions at a slight angle of inclination relative to each other, causing the outer flange to be considerably bent over as it is brought into intimate contact with the inner flange of the adjacent turn of the liner, and increasing the purchase that the outer flange obtains against the inner flange.

Another object of the invention is to provide a flexible shaft housing having improved means for joining two sections of the housing together.

Another object is to provide an improved method of forming a coupling member on the end of a section of flexible housing.

A still further object of the invention is to provide a flexible shaft and housing combination having improved means for joining two sections of the shafting together.

Other objects and advantages will be more apparent from the following description, reference being had to the accompanying drawings forming a part of this specification in which:

Fig. 1 is a front elevation of a portion of the apparatus with which the invention is practiced, illustrating a section of my improved tubing being coiled by the method of the invention;

Fig. 2 is a sectional view taken axially through the coiling rolls;

Fig. 3 is an enlarged detail sectional view of a small section of the liner;

Fig. 4 is an elevation of a section of flexible shafting embodying the invention, progressively broken away to illustrate the successive layers thereof;

Fig. 5 is a longitudinal sectional view of my improved mechanism for joining together two sections of shafting;

Fig. 6 is a longitudinal sectional view showing my improved method of forming the end of a section of housing for attachment of a union element; and Fig. 7 is a transverse sectional view of the same, taken on the line 8—8 of Fig. 6.

As an example of one form in which the invention may be embodied, I have shown in Fig. 4 a length of flexible shafting and my improved housing therefor. The shaft, which may be of conventional construction, is shown at 10. It is journalled for rotation inside of a flexible liner 11 formed of a helically coiled ribbon of metal, preferably steel, which is encased in a sheath 12 of braided wire. Around the sheath 12 is a casing 13.

The casing 13 comprises an outer cover of tough black rubber such as is used in pneumatic tire casings, several layers b, c, and d of tough rubberized fabric, and a layer e of grease resistant sheeting such as "neoprene," which serves to resist the migration of lubricant from the liner 11 to the cover a.

The liner 11 is formed in its edge regions with inner and outer flanges 14 and 15 which overlap in contact with each other under radial compression so as to seal the liner against loss of lubricant which fills the interspaces between its bore and the shaft 10. The radial compression is developed between the axial faces 16 and 17 of the respective flanges, and is such as to maintain these faces in engagement as the liner flexes in use, thereby maintaining the seal.

In an axial direction, the liner is completely free of compression between its abutting edges. This is assured by forming the liner so that the radial edges 18 and 19 of the respective flanges will normally be spaced from the adjacent shoulders 20 and 21 formed at the bases of the cooperating flanges. This axial spacing of adjacent edges serves an additional function. As the liner is flexed, the regions thereof on the inside of the arc of flexure will move toward one another while the outer regions will spread farther apart. Thus the axial length of the flexing portion of the liner may remain the same as when such portion is straight.

In flexible shafting now available, the axial dimension of the housing tends to increase where the housing is flexed. This causes the shaft to be drawn tightly against the liner on the inside of the arc of flexure, and promotes rapid wear. The present invention remedies this condition by providing for uniform axial dimension in the housing, whether flexed or straight.

At a predetermined limit of flexure, the regions of the liner on the inside of the arc of flexure will establish abutting contact with each other. At the same time, the braided sheath 12, the flexibility of which is limited, will limit further opening of the spaces between the turns on the outside of the arc. The latter is made possible by the direct metal to metal contact between the sheath and the liner. The result of such limiting of spreading between the turns will be to establish a definite limit of flexure beyond which the housing can not be easily flexed. This is highly important, since the sharper the bend, the greater is the wear between the shaft and liner, and the greater the absorption of power. In manipulating flexible shaft operated concrete vibrators, for example, the housing is often dragged over a sharp corner of a wall or curb, tending to cause the housing to bend sharply at such corner. The housing of the present invention distributes the flexure throughout sufficient length of the housing to limit the bending at a radius at which the shaft may operate freely without undue wear.

Distribution of flexure is the result of the limiting of spreading of the outer regions and the limiting of contraction of the inner regions of the turns.

The ribbon of which the liner is composed is arcuate in cross section, presenting a succession of turns of inwardly concaved helicoidal surface which forms an ideal bearing surface for the shaft 10. No matter what may be the curvature of the longitudinal axis of the housing, the shaft will always bear against smoothly rounded surface regions. The edge regions of the liner, which in a purely cylindrical liner would tend to bind against the shaft in the flexed regions of the housing, in the present invention never contact the shaft.

In the making of the liner, the arcuate cross-section is developed in the ribbon prior to the coiling of the same into tubular form. This facilitates the production of a tight joint between the faces 16 and 17 of the overlapping flanges, as will presently appear.

In Fig. 1, I have shown portions of an apparatus which may be employed for carrying out the method of the invention. A ribbon 22, in which the flanges 14 and 15 have been previously formed, after being straightened by passing it between a series of sets of straightening rolls, not illustrated herein, is led between a series of pairs of pushing rolls, the last pair of which is shown at 23. From the pushing rolls, the ribbon is threaded through a passage formed between a pair of guide blocks 24 and 25 and is thence forced against a series of three power driven rolls 26, 27 and 28, rotating in the directions indicated by the arrows 29, 30 and 31 respectively, and thereby caused to coil up into helical form to produce the flexible tube constituting the liner. It may be noted that the axes of the rolls 26, 27 and 28 are inclined at an angle of greater than 90 degrees relative to the longitudinal axis of the guide passage between the blocks 24 and 25, so that the ribbon will meet the periphery of the developing tube 11 at the proper angle of tangency relative to the last turn thereof.

In changing from straight to coiled form, the ribbon is subjected to a twisting force which sets up transverse strains, the edge regions thereof pulling toward each other and causing it to become bowed in transverse section as previously described. In forming cylindrical tubing, it has been customary to give to the ribbon, as it passes through the rolls 23, a bellied cross section in which the bowing is opposite to that developed by the coiling. In the present method, the rolls 23 are formed so as to allow the ribbon to bow as described. This bowing occurs in the stretch of ribbon passing from the ends of the guide blocks 24, 25 to the coiling rolls 26, 27, 28 as indicated at 32.

It will now be seen that as the ribbon enters between the rolls 26 and 28, its outer flange 15 will meet the inner flange 14 of the last turn of the formed coil, at an acute angle representing the sum of the inclinations of the two flanges with respect to the axis of the coil, such inclinations being the result of the bowing previously referred to. This is illustrated in Fig. 3. As the ribbon reaches the center of pressure between the rolls, the outer flange 15 will be ironed upwardly into tight contact with the upwardly inclined face 16 of the flange 14. As it is bent upwardly, it will force the flange 14 inwardly until the two flanges are approximately cylindrical.

Since the initial line of contact between the two flanges is at the corner 33 defined between the faces 16 and 18 of the flange 14, the radial compression developed as a result of the bending of the flanges under compression between the rolls 26, 28 will be concentrated largely between the corner 33 and the coacting region of the face 17. The inner flange 14, having been forced inwardly during the ironing process, from an outwardly flaring shape, will have a bias toward such outwardly flaring shape, and the corner 33 will therefore continue to exert pressure against the face 17 as the flanges pull apart during the flexing of the housing, thereby maintaining a good seal. As the housing flexes, the adjacent turns will shift from true axial alignment with each other to positions of slight inclination relative to each other. On the inner side of the arc of flexure, this would tend to tilt the corner 33 away from contact with the coacting face 17, but this tendency is overcome by the outward springing of the flange 14 toward its former flared shape, and consequently the line of contact under compression of the corner 33 against the face 17, will be maintained in all positions of flexure. That is, there will be a continuous helical line of sealing contact throughout the entire length of the housing at all times.

After the liner is formed, it is run through a braiding machine, and the sheath 12 is tightly braided around its exterior surface. Subsequently, the sheeting e, the fabric layers d, c and b, and the cover a, are applied in a manner which may be similar to that described in my pending application Serial No. 284,183, filed July 8, 1939 and the casing is then vulcanized.

The housing may be formed in any length which may be conveniently handled in the shop. These lengths are then divided into sections, each provided at its ends with the improved coupling mechanism which will now be described.

At the region where the original length of housing is to be divided, a portion of the cover 13 is removed as indicated by the dotted lines 13f in Fig. 6. The removal may be effected by grinding. A pair of semi-cylindrical collar sections 34 are assembled in the space formed by the removal of the casing, embracing and in contact with the sheath 12. The collar sections 12 are provided with a series of openings 35 through which welding metal is introduced to weld the collar sections to the braid 12, as at 36. The collar thus formed, and the sheath 12 and liner 11, are severed at the line 37, thus forming two housing sections each having at its end a metal collar extending entirely around and welded to a region of the sheath 12 which projects beyond the casing 13.

A coupling element 38 or 39 is then attached to the end of the housing. The thin sleeve portion 40 of the coupling element is fitted over the collar 34 and adjacent region of the casing 13, and is then beaded inwardly as at 41, compressing the casing 13 inwardly so as to secure a tight purchase against the casing. The bead 41 nearest the end of the housing is formed against the corner of the collar 34, thereby forming a metal to metal clasping connection between the coupling element and the sheath 12 through the medium of the collar 34, and avoiding the possibility of strain being imposed upon the rubber casing 13 by the coupling element.

The coupling element 38 is a female element, provided with an internally threaded region 42, and the element 39 is a male element, provided with an externally threaded portion 43, adapted to be threaded into the portion 42 of a coacting coupling element for joining two sections of housing together. It will be understood that each section of housing is provided with a male element on one end and a female element on its other end, in accordance with standard practice.

The shaft 10 at each end is provided with a squared shank 44, projecting into the bore 45 of its corresponding coupling element. Adjacent shanks 44 are joined by a union nipple 46 having a squared bore snugly receiving the shanks 44, and having a central locating flange 47 adapted to be confined between a shoulder 48 which is defined between the central body and the threaded region 42 of the coupling element 38, and the end of the coupling element 39, respectively. The exterior surface of the nipple 46 is journalled in the bores 45 of the respective coupling elements. The nipple 46 is adapted to rotate freely within the coupling elements and to transmit rotation from one section of shafting to the next.

Having thus described my invention, what I claim is:

1. A flexible housing adapted to retain a substantially constant axial length and to serve as a lubricant container under normal conditions of flexing thereof, comprising, a continuous ribbon helically coiled to form a tube, each coil being formed at its edge regions respectively with inner and outer flanges, said flanges extending only in a substantially axial direction and said flanges of each adjacent coil overlapping each other, said ribbon having a substantial body portion between the inner and outer flanges, a radially outwardly extending shoulder at the base of the inner flange and a radially inwardly extending shoulder at the base of the outer flange, the radial edge of the inner flange being normally spaced from the adjacent radially inwardly extending shoulder and the radial edge of the outer flange being normally spaced from the adjacent radially outwardly extending shoulder, said radial edges of the inner and outer flanges being normally of less distance from the adjacent inwardly and outwardly extending shoulders than the normal distance of overlappage of the inner and outer flanges, whereby upon flexing of the housing under normal conditions, so as to define an arc, the radial edges of the inner and outer flanges contact the adjacent inwardly and outwardly extending shoulders on the inside arc of the housing and on the outside arc of the housing the radial edges of the inner and outer flanges are pulled further away from the adjacent shoulders, said inner and outer flanges on the outside arc of the housing retaining an overlappage condition, thereby maintaining a lubricant seal.

2. A flexible housing as defined by claim 1 wherein the body portion of the ribbon between the flanges is convex-concave in cross section.

3. A flexible housing as defined by claim 1 wherein the overlapping inner and outer flanges are slightly rounded to facilitate movement relative to each other during flexing of the housing.

4. A flexible housing as defined by claim 1 wherein a corner edge of the radial edge of the outer flange is normally purchased against a face of the inner flange, whereby to increase the lubricant sealing qualities of the overlapping flanges.

ARTHUR WILLIAM MALL.